July 6, 1943.  H. W. COLLINS  2,323,297

HEAT INSULATING CONSTRUCTION

Filed May 8, 1940  2 Sheets-Sheet 1

INVENTOR
H. W. Collins
BY
ATTORNEY

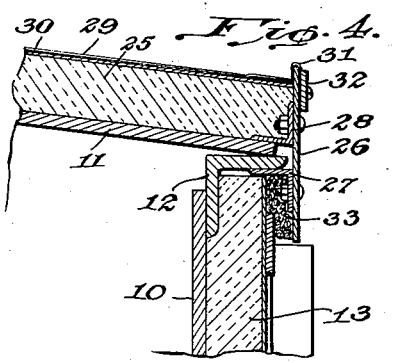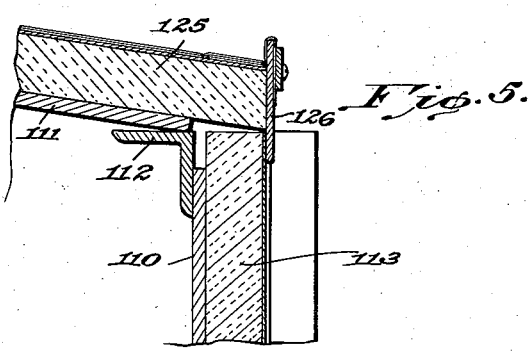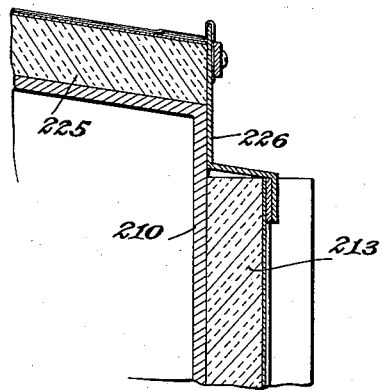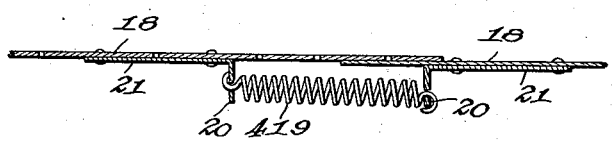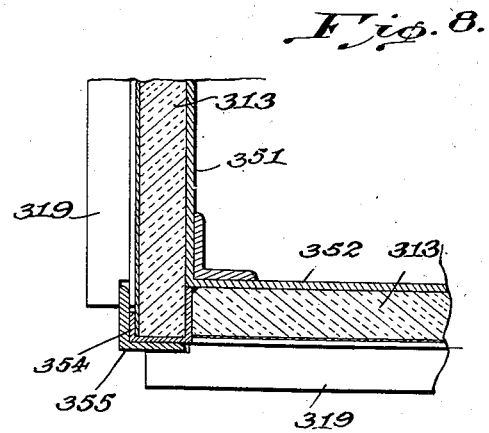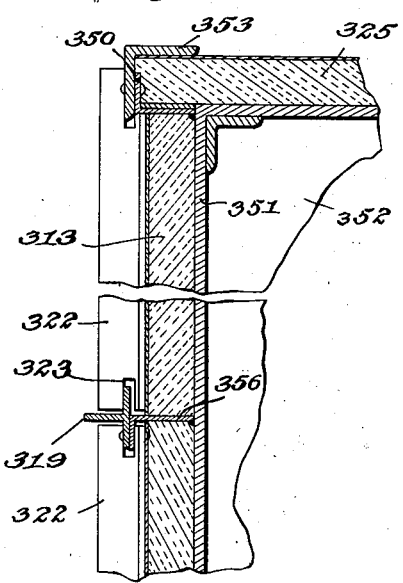

Patented July 6, 1943

2,323,297

UNITED STATES PATENT OFFIC 2,323,297

HEAT INSULATING CONSTRUCTION

Howard W. Collins, Newark, Ohio, assignor to Owens-Corning Fiberglas Corporation, a corporation of Delaware Application May 8, 1940, Serial No. 334,020

8 Claims. (Cl. 154—44)

This invention relates to insulation for vessels, and particularly to heat insulation for relatively large tanks of either cylindrical or rectilinear form for storing fluids outdoors.

Heretofore, insulation of this character has consisted of permanent blanket insulation in the form of either sheet or block insulating material which was wired or otherwise secured to the tank and covered with a layer of cement and finally waterproofed. Another type of insulation heretofore in common use was formed on the tank by successively applied layers of insulating cement over wire mesh. These types of insulation are difficult to install and invariably require the use of skilled labor and the building and rebuilding of scaffolding.

In addition to the difficulties encountered in the erection of such insulation, limitations in the insulating efficiency thereof were encountered inasmuch as it required a relatively large number of metal fastening devices in direct contact with the tank and extending to the outside of the insulation. Furthermore, insulation applied in the form of cement or the like, was difficult, if not impossible, to remove for the purpose of repair.

The present invention is designed to overcome these limitations, and it is one of the objects of the invention to provide an insulating construction for tanks or the like which is readily applied and removed and which requires no skilled labor or rebuilding of scaffolding for its installation.

Another object of the invention is to provide tank insulation characterized by a relatively few, or complete absence of, metal retaining parts in contact with the walls of the tank which would impair the efficiency of the insulation.

The provision of an insulation which is of comparatively light weight; which is inexpensive to manufacture; which is waterproof; and which is highly efficient, is a further object of the present invention.

Other objects and advantages of the invention will be apparent from the following description.

In the drawings:

Figure 4 is a vertical sectional view taken through the wall of the insulated tank in the vicinity of the upper edge thereof, and partly broken away.

Figure 5 is a sectional view similar to Figure 4 showing a modified form of construction.

Figure 6 is a sectional view similar to Figures 4 and 5 showing another modified form of construction.

Figure 7 is an enlarged sectional view of the band taken along a plane represented by the line 7—7 of Figure 1, and illustrating the spring means for tensioning the band during application of the insulating panels to the tank.

Figure 8 is a horizontal sectional view illustrating a vertically extending corner of an insulated tank of rectangular form.

Figure 9 is a vertical sectional view illustrating the upper portion of an insulated tank of rectangular form.

The present invention provides a tank covering insulation of preferably sectional form, the sections having overlapping portions, and a supporting and securing substantially rigid framework for the insulation of open panel or mesh form overlying the insulation. The framework comprises relatively transversely extending metal members which preferably overlie the overlapped portions of the insulation sections and hold the sections in place, the metal members extending in one direction relatively to the tank being secured about the tank, and the members extending crosswise relatively to the first members being held to the tank by said first members.

Figure 1:
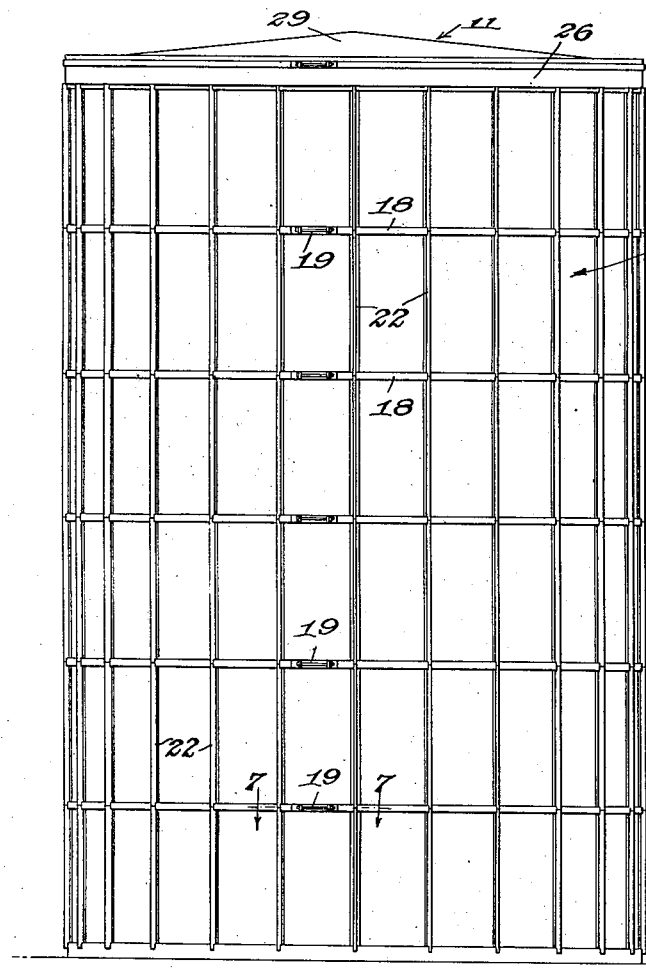
Figure 1 is a side elevational view of a cylindrical tank insulated in accordance with the present invention.
Figure 2:
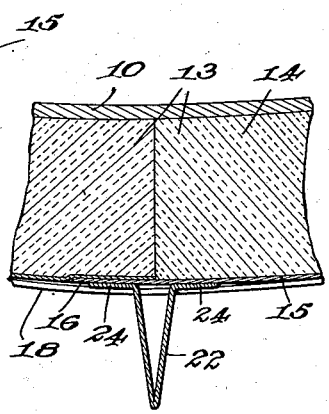
Figure 2 is an enlarged detail fragmentary sectional view taken on a horizontal plane through the insulated tank wall.
Figure 3:
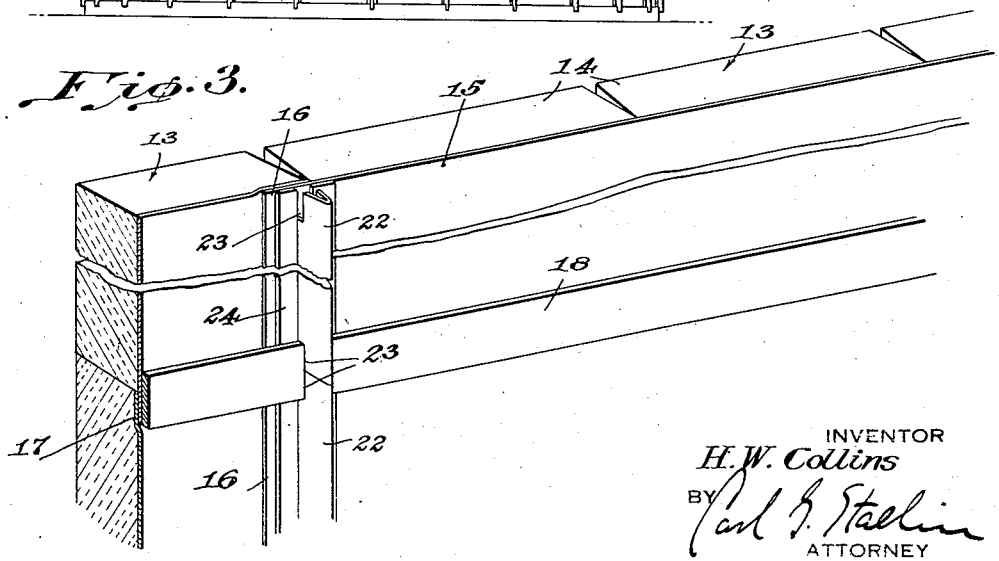
Figure 3 is a fragmentary perspective view partly in section of a pair of adjacent panel assemblies and their associated parts.

Referring to Figures 1 to 4 inclusive, the invention is shown embodied in an insulating construction applied to a cylindrical tank having a vertical side wall 10 and a sloping top wall 11, the two walls being connected together by means including an angle piece 12 (Figure 4).

The insulation by which the wall 10 is covered includes a plurality of bonded insulating units or panels 13 (Figure 3) which are fitted together and held in position on the wall 10 by a metal framework subsequently described. Each panel or unit 13 consists of a plurality of insulation segments 14 to which there is applied a backing sheet 15 of waterproof material such as sheet metal, roofing felt or the like. The backing sheet 15 is preferably flexible and the segments 14 of insulating material have their adjoining edges beveled to extend acutely angularly to the sheet so that when the backing material sheet 15 is curved to accommodate the wall 10, the segments 14 fit closely together about the arc of tank surface covered by the unit and form a continuous covering for the tank wall 10. Each panel 13 is shown as including three such insulating segments but it is to be understood that a lesser or a greater number of such segments may be employed if desired or the insulating material may be integral where the form of surface covered permits. The insulating material from which the segments 14 are formed may be composed of glass wool bats of well known form, as for example, glass wool that has been impregnated with a suitable bonding agent to hold the individual fibers of the wool in their interfelted relationship. The backing sheet 15 of each panel extends beyond the assembled segments along one side and along one end of the assembly to overlap the backing sheet of the next adjacent panel as at 16 at the vertical juncture between adjacent panels and as at 17 at the horizontal juncture between the panels. The overlapping portions are bonded together at assembly by means of bituminous or other cement to render the insulation waterproof at the seams.

The density of the various segments 14 preferably varies from the surface of the tank wall 10 outwardly, the material adjacent the wall being of comparatively low density in order that it may readily follow any irregularities in the contour of the wall. The material adjacent the backing sheet 15 is of comparatively high density to provide a hard outer surface portion or crust for the insulation, to protect the same against injury and to provide a relatively rigid panel.

A plurality of retaining or draw bands 18 formed of flat strip stock extend around the tank wall 10 and overlie the panels, preferably on the line of horizontal overlap of the backing sheet to hold the panels in place on the tank and conceal the horizontal seams 17 between the adjacent superposed panel sections. The retaining bands 18 are drawn up to tightly clasp the panels about the tank by bolts and nuts 19, the bolts being received through openings in ears 20 formed on attachment strips 21 that are secured by means of rivets to the meeting ends of the bands 18.

When applying the panels, it is desirable to first arrange the bands 18 on the tank in approximate positions and resiliently tension them to hold them in place by springs having their ends received in the bolt openings in the ears 20 as illustrated in Figure 7.

In order to space the bands 18 from each other and to conceal the vertical lap seams and further aid in holding the insulating panels 13 in position on the tank wall, a plurality of vertically extending spacing bars 22 extend in vertical alignment between adjacent bands 18, the bands being received in slots 23 at opposite ends of the bars. The bars 22 are substantially T-shaped in cross section and are formed integrally with V-shaped central ribs and oppositely directed lateral flanges 24 (Figure 2) which, when the bars are assembled in the structure, bear against the adjacent edge regions of adjoining insulation panels 13, with the central ribs of the bars preferably aligned with the meeting edges of the panels. In the regions of the slots 23, the flanges 24 underlie the retaining bands 18 while the ribs overlie the bands to form substantially continuous ribs extending from the bottom to the top of the tank wall, the end walls of the slots being in abutting relation with the edges of the bands. The lowermost band is preferably supported on the tank foundation and the bands thereabove are held against downward movement by the bars 22.

After assembly of the panels, the bands, and the bars, the springs 419 are replaced by the bolts 19 and the bands drawn tightly against the insulation material and against the flanges of the bars 22, effecting a substantially rigid framework and firmly securing the insulation material in position on the tank wall.

Various methods of insulating the sloping circular top wall 11 of the tank may be employed and in the form illustrated in Figure 4, insulating panels 25 similar in their structure to the panels 13 are cut to fit the top wall 11 and are placed thereon. A flashing strip or band 26 which is similar to the bands 18 but of somewhat greater width extends around the upper region of the tank and overlies the outer arcuate edges of the insulating panels 14 and is drawn against the same by means of a bolt and nut arrangement similar to that shown in Figure 1. Angle pieces 27 and 28 are bolted to the flashing band 26, the former underlying one flange of the angle piece 12 and the latter overlying the top wall 11 of the tank. One or more layers of conventional mopped roofing material 29 is placed on the backing sheet 30 associated with the panels 24, while additional roofing material 31 extends around the outer edges of the panels beneath the roofing material 29, and passes over the upper edge of the flashing band 26 and is clamped by a retaining band 32 to the outer face of the flashing band 26. A quantity of loose fibrous insulating material 33 is packed into the space existing between the lower portion of the flashing band 26 and the upper edge of the uppermost insulating panels 13.

Figure 5 illustrates a construction wherein insulation of the tank is effected with no heat conducting metal parts extending through the insulation material. In this form the angle pieces 27 and 28 of Figure 4 are omitted, and the flashing strip 126 bears directly against the periphery of the insulating panels 125 and the upper edge of the panels 113. The angle piece 112 which connects the tank side wall 110 and the tank top wall 111 is located within the confines of the tank proper.

In Figure 6 the insulating panels 213 do not extend completely to the top of the side wall 210 of the tank and the flashing band or strip 226 is so constructed as to overlie the peripheral edge of the top insulation panels 225, a portion of the side wall 210 of the tank and the upper edge of the panels 213. This construction is particularly adapted for use in connection with tanks having integral side and top walls.

The improved insulation thus far described is capable of being assembled with comparative ease by a single operator or workman if necessary. The retaining bands 18 are placed about the tank in the approximate positions they will occupy in the completed insulation. The ends of the bands 18 are connected together by the tension springs 19 to tension the bands sufficiently to hold them in place. The insulating panels 13 may then be put in place by applying the panels to the wall 10 of the tank in superposed relation starting from the bottom and proceeding upwardly to form vertical rows, which rows are formed progressively around the tank. Localized regions of the bands 18 may be pulled away from the wall 12 and blocked by means of suitable chucks. A panel 13 may then be inserted behind its two respective bands. Chucks may then be inserted behind the band next above, at a region aligned with the previously inserted panel, and a second panel 13 placed in position above the first panel. After all of the panels 13 forming a vertical row have been positioned behind the bands, a second series of panels are applied in similar manner and the vertical spacing bars 22 may be placed in position to cover the vertical seams between adjacent panels. Insertion of a bar 22 in position in the structure is accomplished by first causing the upper slot 23 to register with a band 18 and, while the bar is held in a slanting position, causing the lower slot 23 to register with the next lower band 18. The bar is then moved to true vertical position to cause the bands to be fully received in the slots.

After the side wall 10 of the tank has been covered with the insulation, the top wall panels 25 formed to fit the top wall 11 may be placed in position on the top wall, the flashing band or strip 26 applied, and the loose fibrous material 33 packed in position behind the latter. Finally, the roofing material 29 and 31 is applied and the uppermost retaining band 32 placed around the flashing band 26, and the insulation is complete.

The application of the insulation to the top wall 111 of the structure shown in Figure 5 and to the top wall 211 of the structure shown in Figure 6 is made in a similar manner, it being preferable in any case to apply the insulation to the side wall of the tank first and to apply the top wall insulation last.

For applying the insulation, a minimum of scaffolding is required and it may even be dispensed with in favor of ladders for most sizes of tanks.

While the specific structure utilized in the insulation of the rectilinear tank 110 of Figures 8 and 9 varies slightly from that utilized for cylindrical tanks, the principles of the invention are not altered materially. A plurality of attaching angle pieces 350 are secured to the four sides of the tank, two of which are represented at 351, 352 and horizontal corner angle pieces 353 are secured thereto and are maintained spaced from the respective upper horizontal edges of the tank. Additional attaching angle pieces 354 secured along vertical edges of the tank serve to maintain vertical angle pieces 355 spaced from the vertical edges of the tank. Medial attachment angle pieces 356 provided on the four sides of the tank serve to support superimposed T-shaped bars 319, corresponding to the draw bands 18, in spaced relation to the tank sides. The insulating panels 313 are placed one above the other in position between the adjacent superimposed T-shape bars 319 and the tank wall, and the vertical T-shape bars 322 corresponding to the spacing bars 22 are finally inserted in position with the slots 323 of the bars received over the vertically extending flanges of the T-shaped bars 319.

Other variations and modifications may be resorted to within the spirit and scope of the invention as defined in the appended claims.

I claim:

1. The combination with a tank or like structure of an insulating covering, comprising: a plurality of insulating units arranged contiguously about the tank side walls, a plurality of parallelly related spaced bands overlying the tank and units and secured about the tank, and a plurality of spacing bars transversely disposed relative to said bands and having slots in the opposite ends thereof receiving respectively adjacent bands to retain the spacing bars in position and relatively space said bands.

2. The combination with a tank or like structure of an insulating covering therefor, comprising: a plurality of vertically superimposed series of insulating units, each unit being formed of fibrous material and the units of each series surrounding the tank side walls in contiguous relationship to one another, a plurality of bands extending horizontally around the tank side walls and covering the junctures between adjacent series of insulating units, and a plurality of vertically extending spacing bars connected at their opposite ends to adjacent bands and covering the junctures between adjacent insulating units in the various series thereof.

3. The combination with a tank or like structure of an insulating covering therefor, comprising: a plurality of vertically superimposed series of insulating units, each unit being formed of felted fibrous material and the units of each series surrounding the tank side walls in contiguous relationship to one another, a plurality of bands extending horizontally around the tank side walls and covering the junctures between adjacent series of insulating units, and a plurality of vertically extending spacing bars having slots formed in opposite ends thereof, the marginal edge portions of adjacent bands extending into the slots to retain the spacing bars in their vertical positions between the bands and to relatively space the bands.

4. A supporting and securing frame of open panel form for sectional tank covering insulation, including: a plurality of bands surrounding the tank and overlying the covering material, a plurality of bars extending at substantially right angles to said bands, relatively spaced about the tank and having end portions received between the bands and the insulating material to be held supportingly against the material and having opposite end abutment portions contacting the edges of adjacent bands to space the bands.

5. A supporting and securing frame of open panel form for tank covering insulation formed of a plurality of rectangular sections, including: a plurality of bands surrounding the tank and overlying the covering material at the parallelly related lines of section juncture extending in one direction, a plurality of bars of T-shape cross-sectional form extending transversely to the bands and overlying the parallelly related lines of section juncture extending transversely to said first named juncture lines, said bars having end portions received between the bands and the insulating material to be held supportingly against the material and opposite end abutment portions contacting the edges of adjacent bands to space the bands, and means securing the bands about the tank and material to fasten the framework about the tank.

6. A supporting and securing frame of panel form for sectional tank covering insulation, including: a plurality of flat bands surrounding the tank in horizontal planes and overlying the covering material at the horizontal lines of juncture between the sections, a plurality of vertically extending bars of T-shape cross-sectional form overlying the vertical lines of juncture between the sections and having end portions received between the bands and the insulating material to be held supportingly against the material and opposite end abutment portions contacting the edges of adjacent bands to space the bands, and means securing the bands about the tank and material to fasten the framework and material about the tank.

7. The combination with a tank or like structure of an insulating covering therefor comprising a plurality of superimposed series of insulating units of rectangular form, each unit being formed of fibrous material and the units of each series surrounding the tank side walls in contiguous relationship to one another, a continuous backing sheet secured to the outer surface of each unit and overhanging the unit at least at two adjoining edges, to thereby overlap the margins of adjacent units in position on the tank, a plurality of bands extending horizontally around the tank side walls and overlying the overlapped portions of the backing sheets at the horizontal junctures between adjacent insulating units, and a plurality of vertically extending spacing bars joined to said bands and overlying the overlapped portions of the backing sheets at the vertical junctures between adjacent insulating units.

8. A supporting and securing frame of open panel form for sectional tank covering insulation, which comprises a plurality of horizontally arranged bands surrounding the tank and overlying the insulation material, the lowermost of said bands being supported by the tank foundation, a plurality of vertically aligned bars overlying the insulation material, each of the bars extending between adjacent bands and the adjoining ends of adjacent bars being provided with mating slots to receive the bands and thereby space adjoining bands relative to each other, whereby all of the frame is supported by the tank foundation, and means for securing said bands about said tank.

HOWARD W. COLLINS.